United States Patent Office 2,871,141
Patented Jan. 27, 1959

2,871,141

SILICONE SUSPENSION AND METHOD OF APPLYING SAME TO COOKING UTENSILS

Edmund L. Van Deusen, Ossining, N. Y.

No Drawing. Application May 2, 1955
Serial No. 505,547

7 Claims. (Cl. 117—49)

My invention relates to a method for treating metallic surfaces with a thermosetting type silicone resin and more particularly to a method and composition which will greatly simplify the methods for applying silicone resins to the cooking surface of metallic cooking implements.

Heretofore silicone coatings of both a thermosetting and thermoplastic nature have been applied to metallic surfaces and to cooking implements and vessels, particularly in the baking art. These silicones have proved useful in protecting the metallic surfaces of the utensil from corrosion or staining and at the same time prevent the adhesion of foodstuffs or carbon which accumulates in the event that the cooking surface is overheated. Thus, the silicone resins when applied to the cooking or baking surface may eliminate the necessity of greasing such surfaces and thereby allow the production of greaseless foodstuffs for people on a fat-free diet.

The methods adopted by the prior art for applying such silicone resins to these cooking surfaces have involved the dissolving of the resin in flammable and/or toxic solvents such as ethers, esters, ketones, hydrocarbons and chlorinated hydrocarbons. The presence of these toxic and flammable solvents has meant that those on the consumer level, such as the housewife, have not been able to readily handle such materials, and consequently the use of silicone resins for this purpose has been rather limited to commercial bakeries and other installations where expert technicians are available to see that they are applied in a manner which will not create a fire hazard or place toxic substances in the food. In fact, a commercial baker, rather than place the silicone coating on his pans himself, will often have this done by specially equipped "pan laundries." Such a procedure would certainly not appeal to the average consumer.

The demand for a readily applicable release agent which will permit greaseless cooking has been accentuated by the fact that there are over 35 million people in the United States who are now overweight and who prefer to follow diets in which the foods they eat contain a minimum of greasy or oily substances. This trend towards this type of diet has in fact, been influenced by recent statistics by insurance companies and others in the medical profession showing that overweight people may expect a shortened life span. At the same time a great many of these people prefer foods which are cooked at high temperatures and have the taste of having been fried rather than those cooked at relatively low temperatures. For example, many of the people have a preference for fried eggs over boiled eggs.

In the past, it has been common to employ grease for high temperature cooking and thereby deny to those on special diets their taste preference for foods cooked at high temperatures. In addition there are some individuals who prefer foods cooked at high temperatures but dislike the taste of the fats which are ordinarily used in such high temperature cooking. Although it has been proposed to use release agents containing silicone resins as a substitute for the grease commonly employed, promotion of such silicones has been severely restricted by the toxicological and fire hazards hereinbefore referred to which are inherent in the organic solvents in which these silicones were dissolved.

I propose to overcome these disadvantages of the methods of the prior art by providing a colloidal or near-colloidal aqueous suspension of semi-polymerized or fully-polymerized thermosetting silicone resins. My novel composition and its application to cooking implements will provide a method for coating kitchenware with thermosetting silicone resins without creating toxicological or fire hazards, without the unpleasantness of handling materials that are obviously "chemical" in nature or odor, and further without requiring lengthy periods of curing at high temperatures.

Accordingly, it is an object of my invention to provide a novel method for applying a thermosetting silicone resin to a metallic surface which is to be subjected to high temperatures.

It is another object of my invention to provide a method for coating the cooking surface of cooking implements with a thermosetting silicone resin and in a manner which may be easily practiced by the unskilled consumer, and which does not involve a toxic or flammable solvent for the silicone.

Still another object of my invention is to provide a novel composition of matter which includes a thermosetting silicone release resin in the form of a colloidal type suspension in a non-toxic, non-flammable aqueous-alcoholic medium.

These and other objects of my invention will become more apparent from the following description.

Essentially my invention involves the production of a suspension of a semi or fully polymerized thermosetting silicone resin by first dissolving the same in a non-toxic alcoholic medium or in other suitable solvents of known non-toxic properties and then mixing such a solution with a larger quantity of water or other liquid which has the properties of being miscible with the aforementioned solvent, a non-solvent for the silicone, and of low toxicity and flammability. The resulting mixture is a suspension of fine particles of silicone resin in a mixed non-toxic system of solvent and non-solvent or entirely of non-solvent, if such is deemed to be more economical. For obvious reasons of convenience and economy, I prefer water as my non-solvent in which the finely divided silicone particles are dispersed.

In accordance with my invention, a semi or fully polymerized alcohol-soluble thermosetting silicone resin is dissolved in a non-toxic solvent such as ethyl alcohol. Preferably a saturated solution is formed. The type of silicone which I propose to use may be one of a number of thermosetting silicone release agents which are well known to the art. These silicones include the following:

(1) Alkylated high molecular siloxy polymers as described in United States Patent No. 2,606,510. These resins are polymers in which the polymer units are $SiO_2$, $RSiO_{1.5}$, $R_2SiO$ and $R_3SiO_{0.5}$ and where R represents a monovalent hydrocarbon radical which, as is known, may be of considerably diverse character. The hydrocarbon radicals may be alkyl, aryl, aralkyl or alkaryl radicals. The resins which are of utility for the present purpose are those which contain between 0.95 and 1.6 hydrocarbon radicals per silicon atom. Preferred resins are those in which the hydrocarbon radicals are alkyls containing less than 4 carbon atoms and phenyls and in which at least 40 percent of the siloxane units are of the type $RSiO_{1.5}$.

(2) Phenyl and methyl polysilane resins of the type described in United States Patent No. 2,606,837 and in which there are from 1.2 to 2 phenyl and methyl radicals per silicone atom and from which 20 to 70 percent of the total phenyl and methyl radicals are phenyl radicals. The organopolysilanes of this type are prepared in accordance with methods described in the patent herein referred to.

(3) Silicone resins contain both polysilane and polysiloxane resins as described in United States Patents Nos. 2,672,104 and 2,672,105. In these resins, some of the silicon atoms in the molecules thereof are interconnected by silicon to silicon bonding and some of the silicon atoms are interconnected by silicon to oxygen bonding, the remaining valences of the silicon atoms being satisfied by phenyl and methyl radicals. These resins are high molecular weight polymers with an average composition of $(CH_3)$ $a$ $(C_6H_5)$ $b$ $SiO$ $c$) in which $a+b$ has a value of from 1.4 to 2 inclusive, $c$ has a positive value and $a+b+2c$ has a value of up to 3.5. Between 30 and 75 percent of the total phenyl and methyl radicals are phenyl radicals.

In all of the above cases the method of preparing the resins referred to are well known to the art and are in fact described in the prior art patents which are mentioned in connection with each of these types of silicones.

After obtaining an alcoholic solution of silicone resin, the said solution is decanted into cold water or any other non-solvent for the silicone which is miscible with the alcohol (or other silicone solvent). If the solvent has a boiling point sufficiently low, it may be removed from the non-solvent by a suitable distillation which will result in a colloidal-type suspension of silicone in a medium consisting almost entirely of non-solvent.

As my solvent, I prefer to use any of the non-toxic alcohols, and for economical reasons I particularly prefer ethanol. As hereinbefore mentioned, for obvious reasons, I prefer to use water as my non-solvent and therefore my novel silicone suspension will ordinarily be an aqueous suspension of colloidal size particles.

The alcohol or other solvent in which the silicone is initially dissolved will for economic reasons ordinarily be saturated with the silicone. When a saturated ethanol solution is produced, ordinarily it is mixed with one-half to ten times its volume of water. It should be decanted into the water so that the undissolved silicone remains in the alcohol vessel, as it is only the particles which are precipitated upon contact with the water that provides my desired colloidal suspension.

I have found that the silicones which I employ are generally soluble in ethanol in an amount of about 4 grams per liter. Of course, in adding the silicone to the alcohol solvent I may add up to 80 grams per liter and recover the portion which does not dissolve for further use.

The amount of silicone present in the subsequent aqueous suspension will vary between 0.4 and 6 grams per liter of water. A more dilute suspension is disadvantageous only in that it requires the application of more liquid to the cooking surface for a given film thickness.

The aqueous suspension of silicones which finally results may contain small amounts (between about 5 and 15 percent) of ethanol, as it would not be economical to attempt to boil off all the ethanol from the water-ethanol silicone mixture. However, even if the alcohol is present in larger amounts there would be no toxic danger and the presence of large amounts of water would virtually eliminate any flammability hazard.

My silicone suspension can then be applied to a heated metallic surface such as the cooking surface of a pan, grill or other cooking implement. It has been found that when applied to aluminum, cooper-clad or even stainless steel cooking ware that foods may be cooked at frying temperatures (i. e. between 400° and 700° F.) without sticking to the pan. It should be emphasized at this point that the melting point of the silicone resin should lie above the highest temperature to which it may be exposed before being applied to the heated metallic surface and below the highest frying temperature contemplated, in other words, between about 100° and 700° F. Moreover, the silicone must be reasonably soluble in alcohol or in any other non-toxic solvent which is used. It must also be capable of rapid curing when exposed to frying temperatures and must be totally nontoxic and contain no toxic additives.

In the preferred embodiment of my process where it is desired to distill out the solvent from the silicone solvent-non-solvent mixture, it should be pointed out that the distilling technique must be carried out in a manner so that an excess heating in the distilling flask does not cause the particles to get sticky and agglomerate. For this reason, I have found it desirable to distill by means of a heated water bath or, in the alternative, to employ vacuum distillation. The final aqueous suspension is applied to the frying or cooking surface after the surface is heated to a temperature between the maximum cooking temperature and the boiling point of water. Application may be made by pouring a measured amount (e. g. a tablespoon) of the silicone suspension on to the heated pan and then letting the water evaporate while the silicone melts and adheres to the metallic surface so as to form thereon an invisible but adhesive film. If desired, the silicone suspension may be distributed over the cooking area by a spatula or by spraying from a polyethylene "squeeze bottle." By this technique, pancakes, fried eggs, or any other substances may then be cooked on a pan or grill so treated without the addition of grease or any other release agent. Moreover, several batches of food may be cooked before it is necessary to recoat the pan.

In the event the cooking implement is cleaned with steel wool or other abrasives after being used, it may be necessary to recoat it with silicone with each use. However, under ordinary non-abrasive cleanings, a coated pan may often be used up to ten times without the need for resorting to a recoating operation.

The thickness of the coating required will vary depending upon the type of pan and heat conductivity. Aluminum and copper-clad kitchenware because of their greater conductivity show less of a tendency to have food particles adhere thereto, while stainless steel does cause greater adherence of food and carbon particles and in this case more frequent application of the silicone may be necessary.

I have described my invention generally. The following is a specific embodiment showing the preparation and application of my novel silicone suspension:

*Specific example*

Approximately 250 cc. of 190 proof commercial grain ethyl alcohol were placed in a flask fitted with a reflux condenser along with about 20 grams (a large excess) of a thermosetting silicone resin in the form of a hard, brittle, nearly 100 percent pure crystaline powder. The particular silicone employed was a 98 percent minimum solids resin with a melting point of 230° F., a specific gravity of 1.17 and a light amber color. The alcohol was boiled for 15 minutes in direct contact with the resin. Without cooling, this saturated alcohol was poured slowly into 250 cc. of ice cold water with rapid stirring. A white, milky color resulted, believed to be a colloidal suspension of the silicone resin. The water and alcohol solution was cooled to 50°. Weighing of the original reaction vessel for a weight loss in silicone resin was hampered by the alcohol retained in the left-over resin mass. Approximations indicated, however, that less than a gram of resin dissolved in the 250 cc. of alcohol.

The alcohol-water-silicone resin suspension mixture was placed in another flask and heated very cautiously to distill out approximately 180 cc. of alcohol, leaving a residue of primarily water, boiling at 197° F. This material was then cooled and used for treating a frying pan.

To use the material for frying, approximately one teaspoon was put on the surface of a four inch stainless steel frying pan. The pan was heated until the liquid in the material began to boil and evaporate. The material was then evenly spread over the flat surface of the frying pan with an ordinary spatula or pancake turner. When the last of the liquid had evaporated from the surface of the pan, the appearance of the pan was essentially unchanged from its original appearance, no obvious film being present. A pancake was then fried in the frying pan, developing crisp surfaces without the aid of fats, oils or greases added to the frying pan. This was followed by the similar frying of an egg (once over lightly), and this was followed by the frying of eggs that had been scrambled in a mechanical beater with milk. In every case, there was not a trace of food residue on the flat surface of the pan. The pan was then scrubbed with a detergent and rubbed with steel wool. This was found to remove the silicone coating from the pan. Thus, when another egg was fried without recoating the pan, it adhered severely.

In connection with the specific example hereinabove described, the silicone material may be spread by means of a spatula or, if this is difficult because of the shape of the cooking surface, applied by means of a spoon so as to flood the pan, after which, in either case, the liquid is boiled to dryness. In general a teaspoon of silicone suspension is required for a four inch pan but there is no danger in using amounts larger than the minimum requirements, and, in fact, the thicker film resulting from using larger amounts may prove advantageous.

While I do not intend to be bound by my theory, it would appear that rather than a film the silicone suspension as it melts and cures onto hot cooking surfaces forms a dot system of small molten resin particles.

My invention in general is particularly advantageous in that it describes a method whereby thermosetting resins can be applied to hot surfaces from a water medium. Thus, its usefulness is not necessarily limited to cooking utensils.

The suspension should be of potential value, for example, as a tire parting agent for rubber companies, or as a substitute for petroleum grease now used as a protective, separating device between red-hot metal and a drop-hammer head. My material, in fact, would have utility wherever a silicone coating on a hot surface is needed or would be helpful and where it is unwise to use toxic or flammable materials.

In the foregoing, I have described my invention only in connection with preferred embodiments thereof. Many variations and modifications of the principles of my invention within the scope of the description herein are obvious. Accordingly, I prefer to be bound not by the specific disclosure herein, but only by the appending claims.

I claim:
1. A method for coating the internal surface of a cooking utensil which comprises heating the said surface to between about 200° and 700° F., applying thereto an aqueous colloidal suspension of a polymerized thermosetting silicone resin, and evaporating the suspension to dryness, thereby forming an adherent solid silicone coating for the surface which is easily cleaned and prevents the sticking of food particles under high temperature cooking conditions so long as the coating remains continuously adherent to the metal.

2. The method of claim 1 in which the thermosetting silicone is selected from the group consisting of alkylated siloxy resins, phenyl and methyl substituted polysilanes, and polysiloxane-polysilane resins.

3. A method for preparing a non-toxic non-flammable aqueous suspension of a polymerized thermosetting alcohol-soluble, powdered silicone resin which comprises forming a saturated solution of the silicone in the alcohol, adding 0.5 to 10 parts of water per part of alcoholic solution thereto, and distilling off sufficient alcohol to produce a distilland consisting of an aqueous colloidal suspension of the said polymerized thermosetting silicone resin which is suitable for application to the heated metallic cooking surface of a cooking utensil.

4. The method of claim 3 in which the alcohol is ethanol.

5. A composition, particularly suitable for coating the heated metallic surface of a cooking utensil, which consists essentially of a colloidal suspension of a polymerized thermosetting alcohol-soluble silicone resin in a non-toxic, non-flammable water-alcohol mixture, the silicone being present in concentrations from 0.4 to 6 grams per liter of water.

6. The composition of claim 5 in which the thermosetting silicone is selected from the group consisting of alkylated siloxy resins, phenyl and methyl substituted polysilanes, and polysiloxane-polysilane resins.

7. The composition of claim 5 in which the silicone is suspended in water containing not more than 15 percent of ethanol.

References Cited in the file of this patent

UNITED STATES PATENTS

| | | |
|---|---|---|
| 1,780,566 | Pedersen | Nov. 4, 1930 |
| 2,462,242 | Webb et al. | Feb. 22, 1949 |
| 2,528,606 | Pedersen | Nov. 7, 1950 |
| 2,559,791 | Peyrot et al. | July 10, 1951 |
| 2,606,510 | Collings | Aug. 12, 1952 |
| 2,623,832 | MacKenzie et al. | Dec. 30, 1952 |
| 2,635,060 | Cheronis et al. | Apr. 14, 1953 |
| 2,672,104 | Clark | Mar. 16, 1954 |

FOREIGN PATENTS

| | | |
|---|---|---|
| 454,471 | Canada | Feb. 8, 1949 |